(12) United States Patent
Bruecken

(10) Patent No.: US 7,305,350 B1
(45) Date of Patent: Dec. 4, 2007

(54) SYSTEM FOR NOTIFYING AN ONLINE CLIENT OF A MOBILE VENDOR

(75) Inventor: Carl Bruecken, Leesburg, VA (US)

(73) Assignee: AOL LLC, Dulles, VA (US)

(*) Notice: Subject to any disclaimer, the term of this patent is extended or adjusted under 35 U.S.C. 154(b) by 722 days.

(21) Appl. No.: 10/134,440

(22) Filed: Apr. 30, 2002

Related U.S. Application Data

(60) Provisional application No. 60/301,454, filed on Jun. 29, 2001.

(51) Int. Cl.
*G06Q 99/00* (2006.01)

(52) U.S. Cl. .............................. 705/1; 705/14; 705/26; 705/27; 340/994; 340/988

(58) Field of Classification Search ................. 705/27, 705/1, 14, 26; 340/994, 988
See application file for complete search history.

(56) References Cited

U.S. PATENT DOCUMENTS

| | | | |
|---|---|---|---|
| 4,632,836 A | 12/1986 | Abbott et al. | |
| 4,850,007 A | 7/1989 | Marino et al. | |
| 5,333,186 A | 7/1994 | Gupta | |
| 5,444,444 A * | 8/1995 | Ross | 340/994 |
| 5,448,625 A | 9/1995 | Lederman | |
| 5,652,784 A | 7/1997 | Blen et al. | |
| 5,710,887 A | 1/1998 | Chelliah et al. | |
| 5,852,775 A | 12/1998 | Hidary | |
| 5,918,213 A * | 6/1999 | Bernard et al. | 705/26 |
| 5,956,693 A | 9/1999 | Geerlings | |
| 5,970,469 A | 10/1999 | Scroggie et al. | |
| 5,983,199 A | 11/1999 | Kaneko | |
| 6,026,375 A * | 2/2000 | Hall et al. | 705/26 |
| 6,052,645 A * | 4/2000 | Harada | 701/212 |
| 6,124,800 A | 9/2000 | Beard et al. | |
| 6,182,795 B1 | 2/2001 | Boerer | |
| 6,185,541 B1 | 2/2001 | Scroggie et al. | |
| 6,189,003 B1 | 2/2001 | Leal | |
| 6,219,696 B1 | 4/2001 | Wynblatt et al. | |
| 6,278,936 B1 * | 8/2001 | Jones | 701/201 |
| 6,414,635 B1 * | 7/2002 | Stewart et al. | 342/457 |
| 6,629,136 B1 * | 9/2003 | Naidoo | 709/219 |
| 2002/0035605 A1 * | 3/2002 | McDowell et al. | 709/206 |
| 2002/0077876 A1 * | 6/2002 | O'Meara et al. | 705/8 |
| 2002/0087522 A1 * | 7/2002 | MacGregor et al. | 707/3 |
| 2002/0087726 A1 * | 7/2002 | Macpherson et al. | 709/245 |
| 2002/0111154 A1 * | 8/2002 | Eldering et al. | 455/414 |

FOREIGN PATENT DOCUMENTS

| | | |
|---|---|---|
| DE | EP0797368 A2 * | 3/1997 |
| EP | 0797368 A2 | 9/1997 |

* cited by examiner

*Primary Examiner*—F. Zeender
*Assistant Examiner*—Asfand M. Sheikh
(74) *Attorney, Agent, or Firm*—Fish & Richardson P.C.

(57) ABSTRACT

Systems and techniques for notifying a potential customer of a vendor that is in geographic proximity to the potential customer. The vendor is associated with a vendor and may include available good and/or services. The potential customer may be notified of several vendors associated with different vendors. Each vendor may be assigned at least one primary service and at least one secondary service.

85 Claims, 6 Drawing Sheets

SYSTEM FOR NOTIFYING AN ONLINE CLIENT OF A MOBILE VENDOR

This application claims the priority benefit of U.S. Provisional Application No. 60/301,454, filed Jun. 29, 2001, which is incorporated by reference in its entirety.

TECHNICAL FIELD

The present invention relates generally to transferring electronic data, and more particularly to notifying an online customer of a mobile vendor.

BACKGROUND

Online service providers constantly are offering new services and upgrading existing services to enhance their subscribers' online experience. Subscribers have on-demand access to news, weather, financial, sports, and entertainment services as well as the ability to transmit electronic messages and to participate in online discussion groups. For example, subscribers of online service providers such as American Online or CompuServe may view and retrieve information on a wide variety of topics from servers located throughout the world. A server may be maintained by the service provider or by a third party provider who makes information and services available through the worldwide network of computers that make up the online service.

America Online has provided subscribers with the ability to send and receive instant messages. Instant messages are private online conversations between two or more people who have subscribed to the instant messaging service and have installed the necessary software. Because such online conversations take place in real time, instant messaging can provide immediate access to desired information. Instant messaging is becoming a preferred means of communicating among online subscribers.

SUMMARY

In one general aspect, a potential customer is notified about available goods and services by detecting an online presence of the potential customer, determining the location of a vendor having available goods and services, determining the geographic proximity of the vendor to a location associated with the potential customer, and notifying the potential customer about the vendor. The potential customer may be notified of different vendors. Each vendor may be assigned one or more primary goods or services, and one or more secondary goods or services. Detecting an online presence may be done transparently.

Implementations may include determining the location of the potential customer. The potential customer's location may be determined using an Internet Protocol address, a telephone number, and/or a Global Positioning System. The preferences of the potential customer may be determined. The potential customer preferences may be determined by tracking addresses requested by the client, and/or contacting the potential customer.

Determining the location of the vendor may the include determining that the vendor has inventory to provide the potential customer. The location of the vendor may be determined by referencing the vendor to an established route. Determining the proximity may include calculating the distance between the current location of the potential customer and an estimated location of the vendor with an established route. The proximity may be determined based on a default location of the potential customer.

Implementations may include receiving a request for service from the potential customer, determining at least one of available goods and services offered by the vendor, determining a distance between the vendor and the potential customer, transmitting a graphical user interface to the client, and/or retrieving a profile associated with the potential customer. The potential customer profile may include a schedule for receiving notifications and/or other preferences.

The graphical user interface may include a map depicting the location of the potential customer. The map may show updated positions of the vendor. The vendor may be notified of the order and/or provided directions to the potential customer.

These and other general aspects may be implemented by an apparatus and/or a computer program stored on a computer readable medium. The computer readable medium may be a disk, a client device, a host device, and/or a propagated signal.

The potential customer may be at a non-default location. The non-default location information may be provided by a carrier providing mobile services. Determining that the potential customer is at a non-default location may include determining that the potential customer is using a mobile device instead of a desktop computer.

Other features and advantages will be apparent from the following description, including the drawings, and the claims.

DETAILED DESCRIPTION

Figure 1:
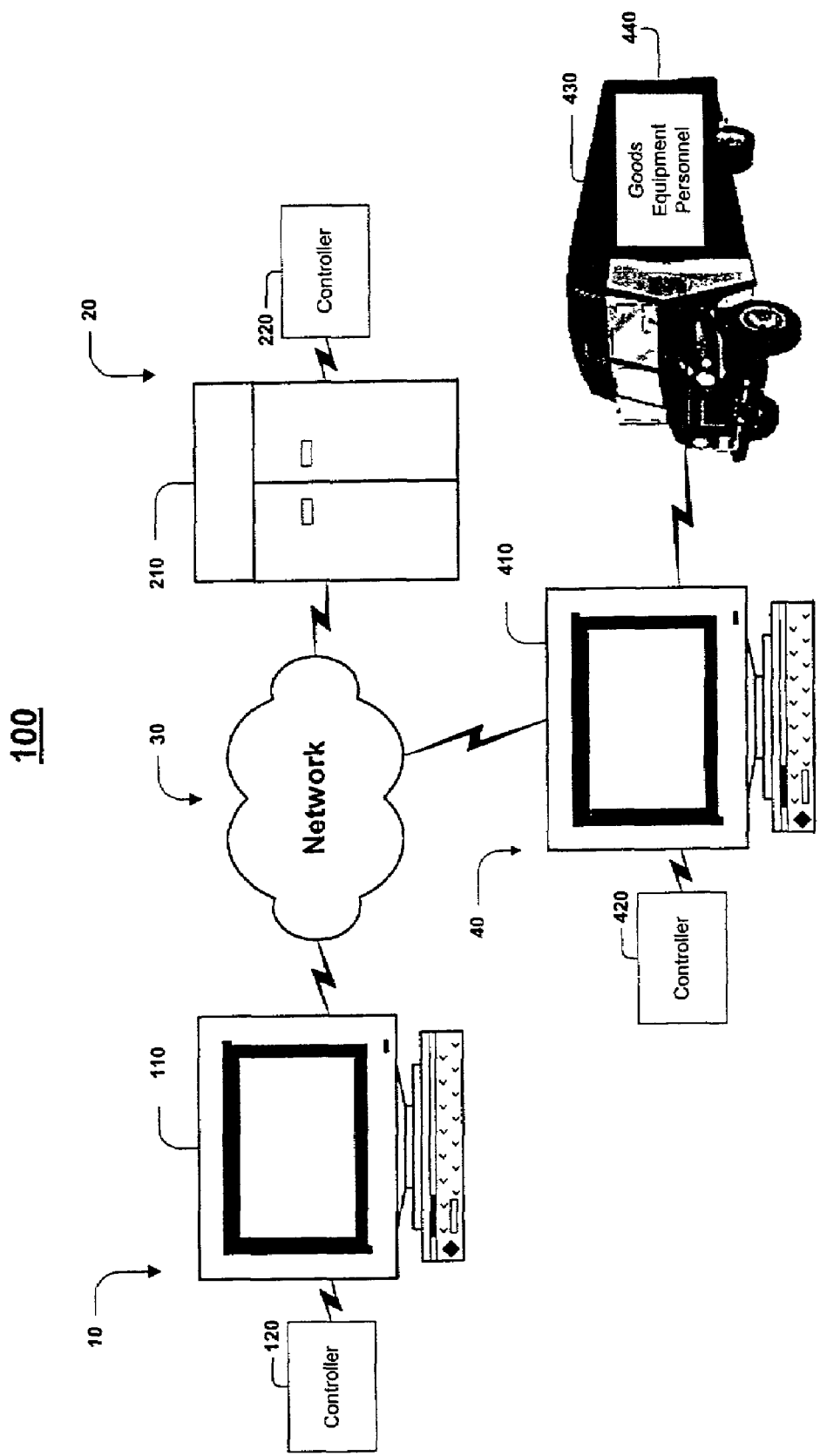
FIGS. 1-3 are block diagram of a communication system.
Figure 2:
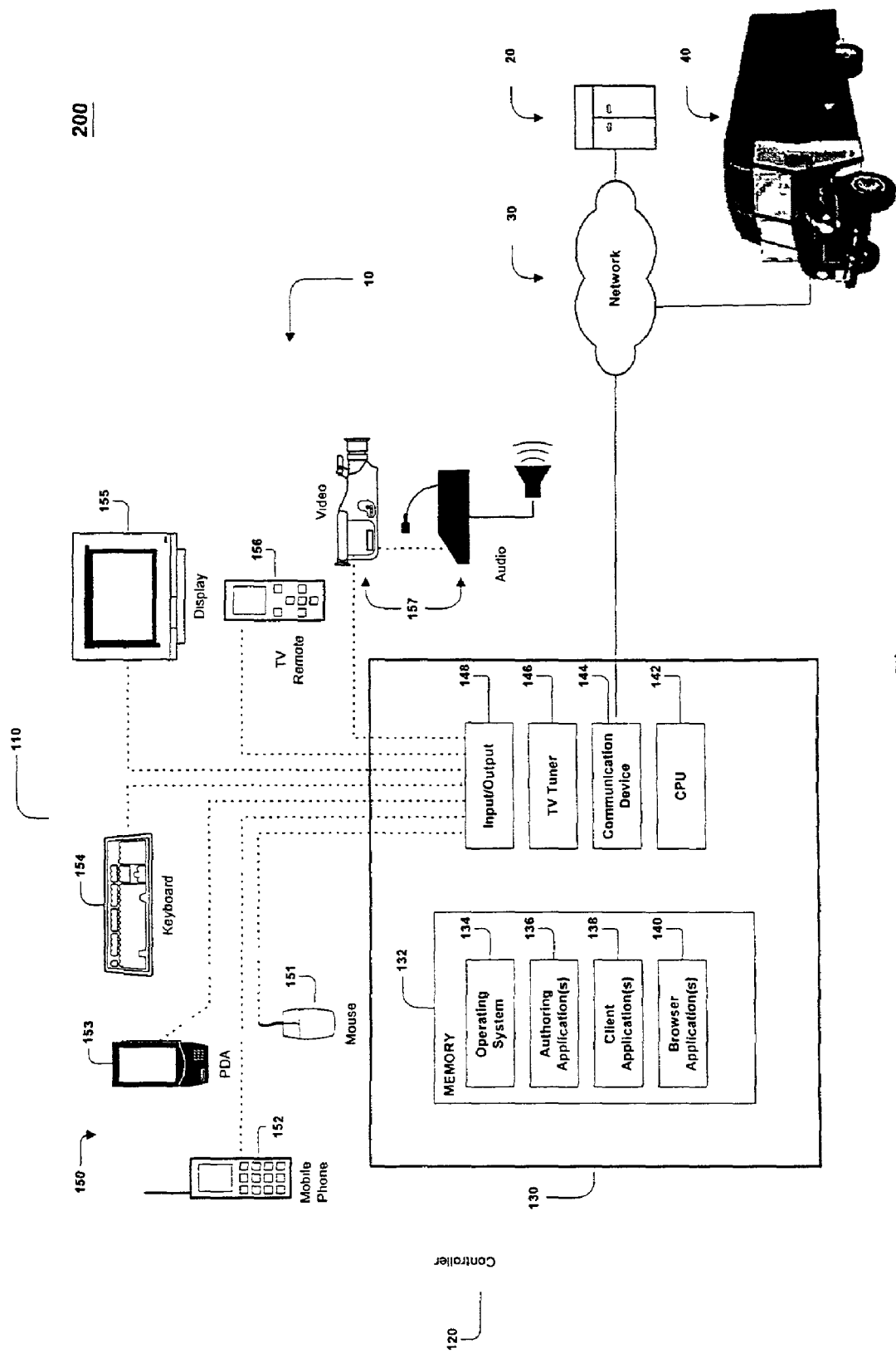
Figure 3:
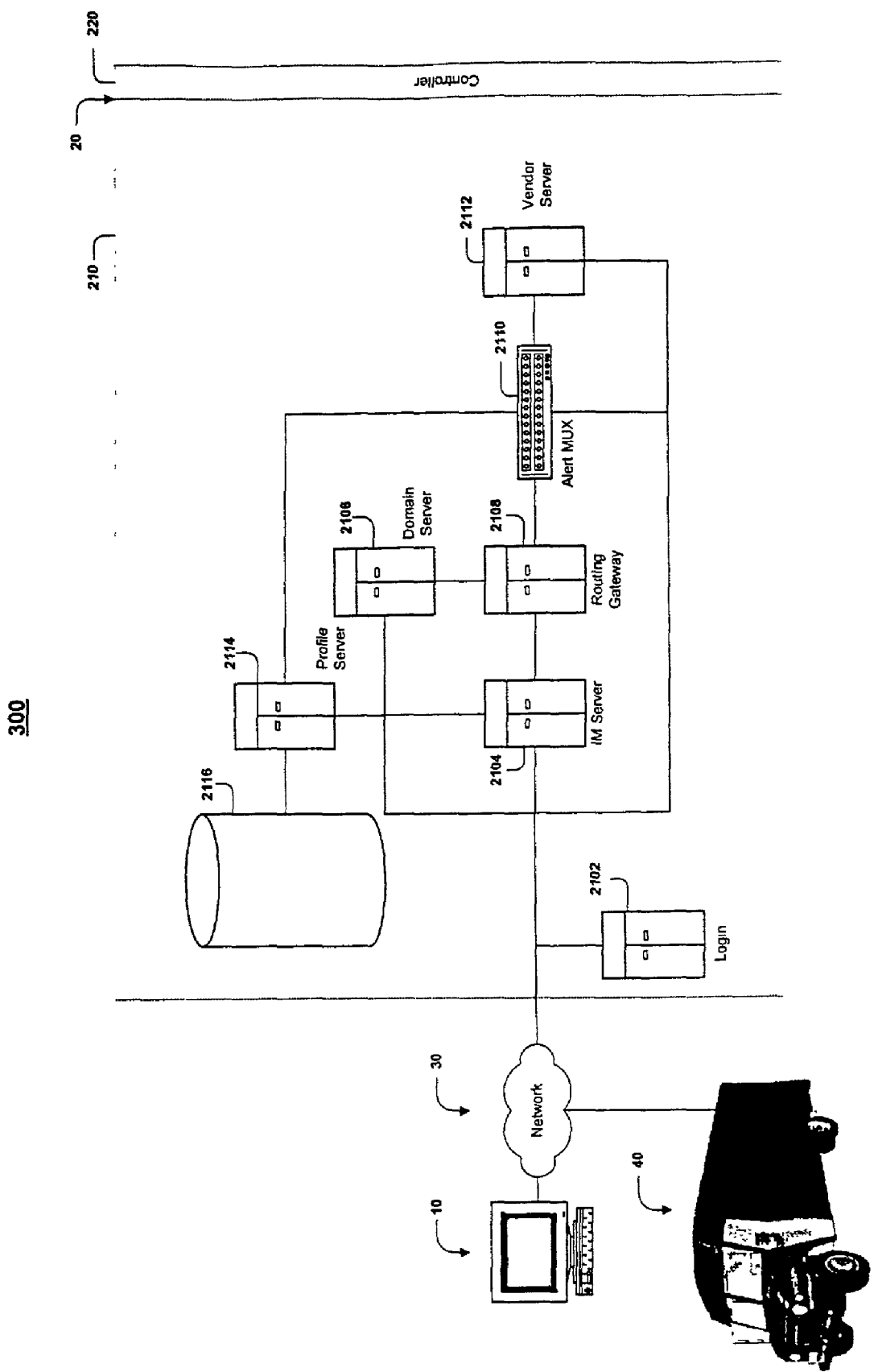

FIGS. 1-3 illustrate an exemplary communications system for implementing techniques to transfer electronic data. For brevity, several elements in the figures described below are represented as monolithic entities. However, as would be understood by one skilled in the art, each of these elements may include numerous interconnected computers and components designed to perform a set of specified operations and/or may be dedicated to a particular geographical region.

Referring to FIG. 1, a communications system 100 is configured to transfer electronic data. The communications system 100 includes a client system 10 in communication with a host system 20 through a network 30. The client system 10 and host system 20 also are in communication with a vendor system 40 through the network 30. The host system 20 is configured to coordinate and/or otherwise facilitate interaction between the client system 10 and the vendor system 40.

In general, the client system 10 includes a computer system having hardware and/or software components for communicating with the host system 20, the network 30, and the vendor system 40. The client system 10, the host system 20, and the vendor system 40 each may include one or more general-purpose computers (e.g., personal computers), one or more special-purpose computers (e.g., devices specifically programmed to communicate with each other), or a combination of one or more general-purpose computers and one or more special-purpose computers. The client system 10, the host system 20, and the vendor system 40 may be structured and arranged to communicate using various communication protocols (e.g., http), encapsulation protocols (e.g., UDP), and/or proprietary protocols; to establish peer-to-peer (e.g., socket) connections between network elements; and/or to operate within or in concert with one or more other systems (e.g., the Internet and/or the World Wide Web).

In one implementation, the client system 10 includes a client device 110 operating under the command of a client controller 120, the host system includes a host device 210 operating under the command of a host controller 220, and the vendor system 40 includes a vendor device 410 operating under the command of a vendor controller 420. An example of a device (e.g., client device 110, host device 210, vendor device 410) is a general-purpose computer capable of responding to and executing instructions in a defined manner. Other examples include a special-purpose computer, a personal computer ("PC"), a workstation, a server, a component, a machine, a tool, other physical or virtual equipment, or some combination thereof capable of responding to and executing instructions.

An example of a controller (e.g., client controller 120, host controller 220, vendor controller 420) is a software application loaded on a device (e.g., client device 110, host device 210, vendor device 410) for commanding and directing communications enabled by the device. Other examples include a computer program, a piece of code, an instruction, another device, or some combination thereof, for independently or collectively instructing the device in interact and operate as desired. The controller (e.g., client controller 120, host controller 220, vendor controller 420) may be embodied permanently or temporarily in any type of machine, component, physical or virtual equipment, storage medium, or propagated signal capable of providing instructions to a device (e.g., client device 110, host device 210, vendor device 410). As indicated by the broken lines, the controller may be separate from or integral with the associated device.

The network 30 may include one or more delivery networks for directly or indirectly connecting the client system 10, the host system 20, and the vendor 40 irrespective of physical separation. Examples of a delivery networks include, but are not limited to, a local area network ("LAN"), a wide area network ("WAN"), the Internet, the Web, a telephony network (e.g., analog, digital, wired, wireless, PSTN, ISDN, or xDSL), a radio network, a television network, a cable network, a satellite network, and/or any other network configured to carry data. Each network may include one or more elements, such as, for example, intermediate nodes, proxy servers, routers, switches, adapters, and wired or wireless data pathways, configured to direct and/or deliver data.

In one implementation, the communications system 100 is structured and arranged to operate in an online shopping/buying environment and to enable real-time messages (e.g., instant messages) to be exchanged among the client system 10, the host system 20, and the vendor system 40. In such an implementation, a potential customer (not shown) affiliated with at least one of the client system 10, the host system 20, and/or the vendor system 40 is notified of an opportunity to purchase an available good or service offered by the vendor system 40.

The vendor system 40 includes a vendor device 410 (e.g., computer, computer system, wireless telephone, radio, paper, appliance, PDA, communicator) for communicating with the client system 10 and/or the host system 20 through the network 30. The vendor system 40 also includes a vehicle 430 for traveling to the location of a client system 10 as well as goods, personnel, and/or equipment 440 necessary to provide goods and/or to perform services at the client location 10. In one implementation, the vehicle 430 in the vendor system 40 is loaded with available goods, personnel, and/or equipment. The vehicle 430 may be loaded according to requests received from client systems 10 and/or loaded with a predetermined inventory. The goods, personnel, and/or services may be loaded at one more loading locations along a route traveled by the vehicle 430. The vehicle 430 may acquire available goods, personnel and/or equipment from a resource supplier, such as, for example, a business, a store, a warehouse, a partner, a base of operations, and/or a hub. As indicated by the broken lines, the vendor device 410, the vendor controller 420, and the vehicle 430, as well as the goods, equipment, and/or personnel may be separate from or integral with each other.

The vendor system 40 typically offers on-site services at a buyer's location. For example, the vendor system 40 may offer a product selling service (e.g., door-to-door product or subscription selling), a product delivery service (e.g., restaurant food, groceries, medical products, newspapers, mail, periodicals), a product pick-up service (e.g., laundry pick-up, dry-cleaning, pick-up, recycling retrieval, trash removal), a transportation service (e.g., passenger shuttle, taxi, bus), an installation service (e.g., telephone installation, cable installation, satellite installation, product installation), a maintenance service (e.g., lawn care, house cleaning, utility metering, product testing), and/or a repair service (e.g., house repair, automobile repair, product repair). The vendor system 40 may offer one or any combination of goods and/or services. The goods and/or services offered may be related to one or more brands, suppliers, providers, and/or manufacturers. For example, certain foods may be offered with certain medical products (e.g., antacids). The goods/services also may have a common theme. For example, a morning theme may involve delivering a newspaper, picking up laundry, and selling breakfast food.

The vendor system 40 may employ one or more vehicles (e.g., vehicle 430) that are dedicated to offering the on-site services to buyers. A vehicle 430 may be deployed to a buyer's location in response to a request from the buyer and/or may be deployed along an established route at a certain time (e.g., daily delivery/service route). When deployed, a vehicle 430 may be assigned one or more primary services and one or more secondary services. For example, a vehicle 430 may be assigned to deliver newspapers (primary service) to subscribers along an established route, but also may be assigned to sell and/or deliver bottles of orange juice (secondary service) in certain situations. In one implementation, the vendor system 40 instructs the vehicle to offer the secondary service in tandem with the primary service. In another implementation, a secondary service is offered only after a primary service is completed. For example, a vendor system 40 may instruct a repair vehicle 430 to offer certain products when returning from a repair service location. In other implementations, the vendor system 40 instructs the vehicle 430 to offer goods and/or services according to a set hierarchy and/or "on-the-fly."

FIG. 2 illustrates a communications system 200 including a client system 10 communicating with the host system 20 and the vendor system 40 through a network 30. Examples of each element within the communications system of FIG. 2 are broadly described above with respect to FIG. 1. In particular, the client system 10, the host system 20, the network 30, and the vendor system 40 have attributes comparable to those described with respect to FIG. 1.

As shown in the client system 10 of FIG. 2, the client device 110 includes a general-purpose computer 130 having an internal or external storage 132 for storing data and programs such as an operating system 130 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 136 (e.g., word processing, database programs, spreadsheet programs, or graphics programs) capable of generating documents or other electronic content; client applications 138 (e.g., AOL client, CompuServe client, AIM client, AOL TV client, or ISP client) capable of communicating with other computer users, accessing various computer resources, and viewing, creating, or otherwise manipulating electronic content; and browser applications 140 (e.g., Netscape's Navigator, Microsoft's Internet Explorer, Java's Microbrowser) capable of rendering standard and/or clipped Internet content.

The general-purpose computer 130 also includes a central processing unit ("CPU") 142 for executing instructions in response to commands from the client controller 120. In one implementation, the client controller 120 includes one or more of the application programs installed on the internal or external storage 132 of the general-purpose computer 130. In another implementation, the client controller 120 includes application programs externally stored in and performed by one or more device(s) external to the general-purpose computer 130.

The general-purpose computer 130 further includes a communication device 144 for sending and receiving data. One example of the communication device 144 is a modem. Other examples include a transceiver, a set-top box, a communication card, a satellite dish, an antenna, or another network adapter capable of transmitting and receiving data over the network 30 through wired or wireless data pathways (not shown). The general-purpose computer 130 also may include a television ("TV") tuner 146 for receiving television programming in the form of broadcast, satellite, and/or cable TV signals. As a result, the client service 110 can selectively and/or simultaneously display network content received by communications device 144 and television programming content received by the TV tuner 146.

The general-purpose computer 130 includes an input/output ("I/O") interface 148 for wired or wireless connection to various peripheral devices 150. Examples of peripheral devices 150 include, but are not limited to, a mouse 151, a mobile telephone 152, a personal digital assistant ("PDA") 153, an MP3 player (not shown), a keyboard 154, a display monitor 155 with or without a touch screen input, a TV remote control 156 for receiving information from and rendering information to subscribers, and an audiovisual input device 157.

Although FIG. 2 illustrates examples of devices such as a mobile telephone 152, a PDA 153, an MP3 player (not shown), and a TV remote control 156 as being peripheral with respect to the general-purpose computer 130, other implementations may include the functionality of the general-purpose computer 130 in such devices so that they operate as the client device 110. For example, the mobile telephone 152 or the PDA 153 may include computing and networking capabilities and function as a client device 110 by accessing the delivery network 30 and communicating with the host system 20. Furthermore, the client system 10 may include one, some or all of the components and devices described above. Moreover, the above description of the client device 110 and the client controller 120 may pertain to like aspects of the vendor device 410 and the vendor controller 420.

Referring to FIG. 3, a communications system 300 is capable of delivering and exchanging information between a client system 10, a host system 20, and a vendor system 40 through a network 30. Examples of each element within the communications system 300 are broadly described above with respect to FIGS. 1 and 2. In particular, the client system 10, the host system 20, the network 30, and the vendor system 40 have attributes comparable to those described with respect to FIGS. 1 and 2.

As shown in FIG. 3, the host system 20 includes a host device 210 and a host controller 220. The host controller 220 is generally capable of transmitting instructions to any or all of the elements of the host device 210. For example, the host controller 220 may include one or more software applications loaded on the host device 210 or may include any of several other programs, machines, and devices operating independently or collectively to control the host device 210.

In one implementation, the host device 210 includes or is part of an OSP ("Online Service Provider") host complex that provides instant messaging ("IM") capability to subscribers. In general, an OSP supports several different services, such as email, instant messaging, discussion groups, chat, news services, and Internet access. The OSP is generally designed with an architecture that enables the machines within the OSP to communicate with each other according to certain protocols. For example, the OSP may employ one or more OSP protocols and custom dialing engines to enable access by selected client applications. The OSP may define one or more specific protocols for each service based on a common, underlying proprietary protocol.

The OSP may support IM services irrespective of a subscriber's network or Internet access. That is, the OSP may allow a subscriber to send and receive instant messages regardless of whether the subscriber has access to any particular ISP. The OSP may support associated services, such as administrative matters, advertising, directory services, chat, and interest groups specifically related to the instant messaging. The OSP may support IM services locally or at a separate IM host complex. In an environment employing multiple host complexes, the host device 210 may include one or more gateways that connect and link the host complexes. Such gateways typically are privy to information regarding the protocol type anticipated by a destination complex, which enables any necessary protocol conversion to be performed incident to the transfer of data from one complex to another.

To enable access to the OSP host device 210, the client system 10 and the vendor system 40 may include proprietary communications software, such as, for example, an OSP client application and/or an IM client application. The communications software is designed to facilitate a subcriber's interaction with various online services and may provide access to all available services within the OSP host device 210.

The host system 20 includes a login server 2102 for authorizing access by one or more client systems 10 and vendor systems 40 to various elements (e.g., OSP servers) of the host device 210. The login server 2102 may implement one or more authorization procedures to enable simultaneous access to the OSP features and/or IM features. For example, to access the OSP host device 210 and being an instant messaging session, the client system 10 (or vendor system 40) establishes a connection to the login server 2012. The login server 2102 determines whether the user associated with the system is authorized to access other areas of the OSP device 210 by verifying a subscriber identification and password.

If the user is authorized to access other areas of the OSP host device 210, the login server 2102 employs a hashing technique on the subscriber's screen name to identify a particular IM server 2104 for use during the subscriber's session. The login server 2102 provides the client system 10 with the IP address of the particular IM server 2104, gives the client system 10 an encrypted (e.g., a cookie), and breaks the connection. The client system 10 then uses the IP address to establish a connection to the particular IM server 2104 through the network 30, and obtains access to the identified IM server 2104 using the encrypted key. Typically, the client system 10 will include a Winsock API ("Application Programming Interface") that enables the client system 10 to establish an open TCP connection to the IM server 2104.

Once a connection to the IM server 2104 has been established, the client system 10 may directly or indirectly transmit data to and access content from the IM server 2104 and one or more associated domain servers 2106. The IM server 2104 supports the fundamental instant messaging services and the domain servers 2106 may support associated services, such as, for example, administrative matters, directory services, chat and interest groups. In general, the purpose of the domain servers 2106 is to lighten the load placed on the IM server 2104 by assuming responsibility for some of the services offered by the OSP host device 210. By accessing the IM server 2104 and/or the domain server 2106, a subscriber can use an IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the World Wide Web.

In the implementation of FIG. 3, the IM server 2104 and the domain server 2106 are directly or indirectly connected to a routing gateway 2108. The routing gateway 2108 facilitates the connection between the IM server 2104 or the domain server 2106 and one or more alert multiplexors ("MUXs") 2110, for example, by serving as a link minimization tool or hub to connect several IM servers 2104 or several domain servers 2106 to several alert MUXs 2110. In general, an alert MUX 2110 maintains a record of alerts and subscribers registered to receive the alerts.

Once the client system 10 is connected to the alert MUX 2110, a subscriber can register for and/or receive one or more types of alerts. The connection pathway between the client system 10 and the alert MUX 2110 is determined by employing another hashing technique at the IM server 2104 to identify the particular alert MUX 2110 to be used for the subcriber's session. Once the particular MUX 2110 has been identified, the IM server 2104 provides the client system 10 with the IP address of the particular alert MUX 2110 and gives the client system 10 an encrypted key (i.e., a cookie). The client system 10 then uses the IP address to connect to the identified alert MUX 2100 through the network 30 and obtains access using the encrypted key.

the key MUX 2110 is connected to a vendor server 2112, where state changes are continuously updated for one or more vendor systems 40. In general, information regarding state changes of vendor systems 40 is gathered and used by the OSP host device 210. The vendor server 2112 is capable of detecting a feed corresponding to a particular vendor system 40. The vendor server 2112 may include a piece of code (alert receive code) capable of interacting with another piece of code (alert broadcast code) on the vendor system 40 when a state change occurs. In general, the alert receive code installed on the vendor server 2112 instructs the alert broadcast code installed on the vendor system 40 to send a feed to the vendor server 2112 upon the occurrence of a particular state change. Upon detecting a feed, the vendor server 2112 may notify the alert MUX 2110 and/or the client system 10 of the detected feed.

In the implementation of FIG. 3, the OSP host device 210 includes a subscriber profile server 2114 connected to a database 2116 for storing large amounts of subscriber profile data. The subscriber profile server 2114 may be used to enter, retrieve, edit, manipulate, or otherwise process subscriber profile data. In one implementation, a subscriber's profile data include, for example, the subscriber's buddy list, alert preferences, designated stocks, identified interests, and geographic location. The subscriber may enter, edit and/or delete profile data using an installed OSP and/or IM client application on the client system 10 to interact with the subscriber profile server 2114.

Because the subscriber's data are stored in the OSP hots device 210, the subscriber does not have to reenter or update the data in the event that the subscriber accesses the OSP host device 210 using a new or a different client system 10. Accordingly, when a subscriber accesses the OSP host device 210, the IM server 2104 can instruct the subscriber profile server 2114 to retrieve the subscriber's profile data from the database 2116 and to provide, for example, the subscriber's buddy list to the IM server 2104 and the subscriber's alert preference to the alert MUX 2110. The subscriber profile server 2114 also may communicate with other servers (not shown) in the OSP host device 210 to share subscriber profile data with other services. Alternatively, user profile data may be saved locally on the client device 10.

Figure 4:
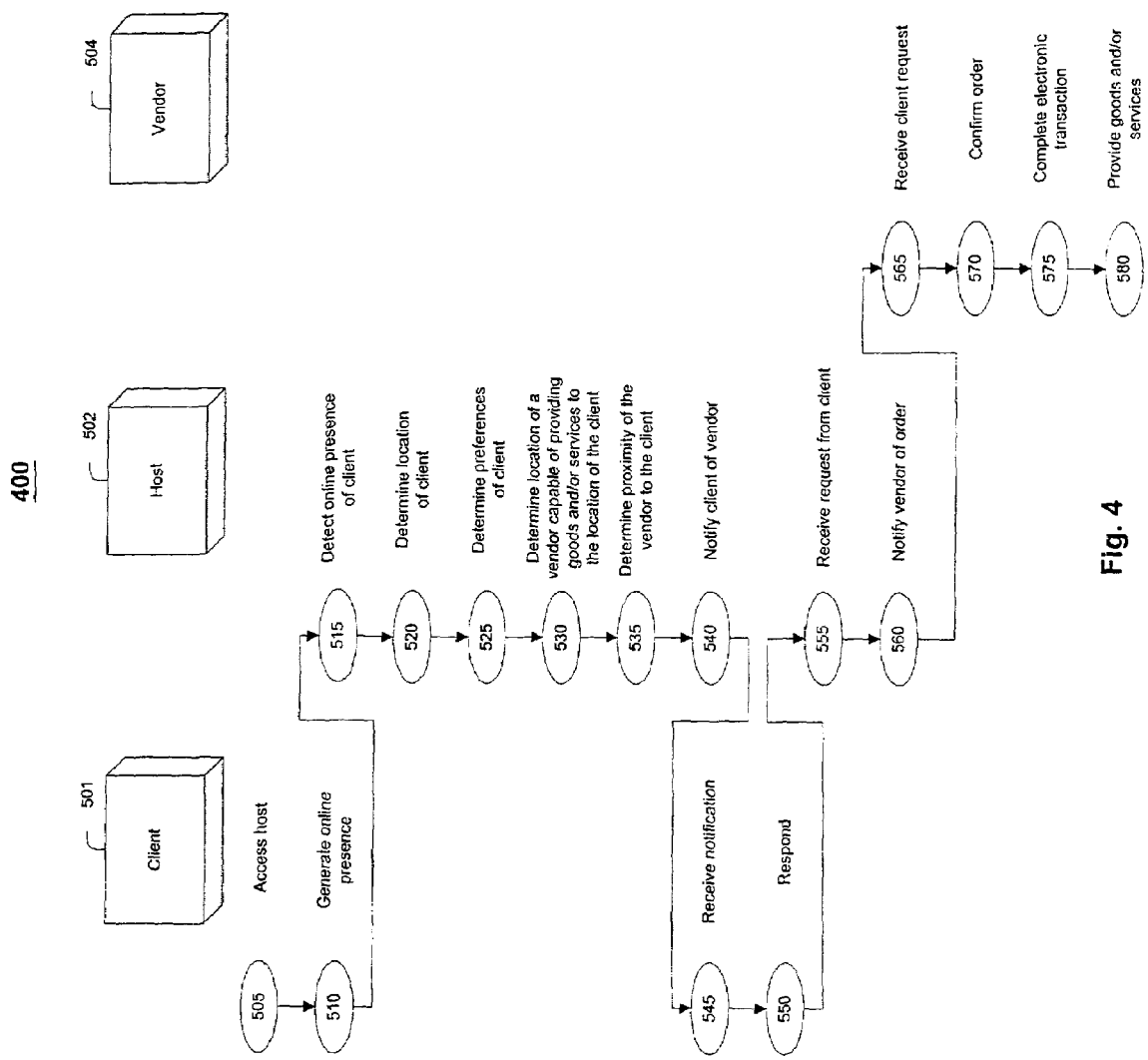
FIGS. 4 and 5 are a flow chart of communications methods that may be implemented by the communications system of FIGS. 1-3.

Referring to FIG. 4, a client 501, a hot 502 and a vendor 504 interact according to a procedure 400 to transfer electronic data. Examples of each element of FIG. 4 are broadly described above with respect to FIGS. 1-3. In particular, the client 501 may have attributes comparable to the client system 10, client device 110, and/or the client controller 120 of FIGS. 1-3. The host 502 may have attributes comparable to the host system 20, the host device 210, and/or the host controller 220 of FIGS. 1-3. The vendor 504 may have attributes comparable to the vendor system 40, the vendor device 410, the vendor controller 420, and/or the vehicle 430 of FIGS. 1-3. The client 510, the host 502, and the vendor 504 may be directly or indirectly connected to each other by a network.

The procedure 400 of FIG. 4 generally pertains to an online shopping/buying environment in which a potential customer affiliated with at least one of the client 501, the host 502, and/or the vendor 504 is notified of an opportunity to purchase an available good or service offered by the vendor 504.

Initially, the client 501 accesses the host 502 (step 505). In one implementation, the client 501 is associated with a potential customer (e.g., individual person or business entity) and the host 502 is an online service provider ("OSP") enabling and/or providing instant messaging capability and correlating information relating to the online customer and the vendor 504. The client 501 may access the host 401 using any available device (e.g., computer, appliance, pager, PDA, interactive television, telephone) and/or controller (e.g., software program, client application, browser application).

The client 501 generates an online presence for the potential customer (step 510). In general, an online presence is a state in which the client 501 is capable of receiving for the potential customer a communication over a network (e.g., WAN, LAN, Internet, Web, OSP network, telephone network). In one implementation, the client 501 includes a controller (e.g., software program, client application, browser application) for connecting to the host 502 and managing the exchange of data transferred across a network between the client 501 and the host 502 (i.e. generating an online presence).

The host 502 detects the online presence of the client 501 (step 515). In one implementation, the client 501 generates an online presence and the host 502 detects the online presence when the client 501 establishes a connection to a particular server (e.g., IM server 2104, e-mail message server, web server, chat room server). A server (e.g., login server 2102) on the host 502 may require authorization of the client 501 prior to establishing a connection to the server. The host 502 may detect the online presence of the client 501 transparently so that the client 501 is unaware of the host 502. Alternatively, the client 501 may notoriously inform the host 502 of its online presence.

The host 502 may maintain a list of clients 501 and/or associated customers that are currently online (i.e. connected to the host 502). In one implementation, a network of servers (e.g., IM servers 2104) maintains the list of online customers. Upon detection of the online presence of the client 501 or at some time or event thereafter, the host 502 transmits data capable of being rendered by the client 501 as a user interface ("UI") indicating the online status of the potential customer.

The host 502 may monitor data transmissions from the client 501. For example, the host 502 may track referring and destination addresses (e.g., URLs) requested by the client 501 and then associate a list of products and/or services related to the requested URLs with the client 501 or an associated customer. In one implementation, host servers (e.g., IM servers 2104) are capable of tracking addresses.

The host determines the location of the client 501 or a location associated with the potential customer (step 520). In one implementation, this step is performed after the host 502 detects the online presence of the client 501 (stet 515). In other implementations, this step is performed prior to or concurrently with detection of the online presence of the client 501 (step 515). Determining the location of the client 501 or the associated customer may include detecting an address (e.g., IP address), port, or at least a portion of a dial-in telephone number used by the client 501 to connect to a server (e.g., login server 2102) within the host 502. The host also may access a customer database (e.g., database 2116) to obtain residence information of a particular customer. Determining the location of the client 501 may include using a global positioning system ("GPS") and/or other type of system capable of identifying the geographic location of the client 501.

The host 502 also determines preferences of the potential customer associated with the client 501 (step 525). In one implementation, the host 502 accesses stored preferences from the client 501 and/or a database (e.g., database 2116) within the host 502. In other implementations, the host 502 prompts a potential customer associated with the client 501 to enter online preferences. The online preferences may include vendor notification preferences such as which particular vendors are permitted to contact the potential customer as well as the timing and manner of receiving notification from a vendor 404. Preferences also may include a profile specifying particular interests and/or favorites of the potential customer such as food, clothing, music, television program, sports, and hobbies. For example, a potential customer may indicate a preference to receive notification during a certain time of day from a vendor that offers a certain type of food. The potential customer also may set preferences actively to indicate a desire to purchase a particular good and/or service or to be contacted at a particular time by a particular vendor 504.

Next, the host 502 determines a location of a vendor 504 capable of providing goods and/or services to the location associated with the client 501 (step 530). In one implementation, the host 502 determines the location of each vendor 504 participating in a particular marketing program sponsored by the host 502. Host elements such as, for example, IM servers 2104 and/or alert MUX 2110 may be configured to determine the location of the vendor 504. The host 502 may eliminate some vendors 504 from consideration based on the preferences of the client 501. The host 502 also may eliminate a vendor 504 based on reports from the vendor 504 that indicate insufficient inventory or other incapability to deliver goods and/or perform services.

Determining the location of the vendor 504 may include using a GPS to determine the geographic location of a vehicle or a base of operations (e.g., store, warehouse, supply center, call center) associated with the vendor 504. If the vendor 504 is connected to a server (e.g., IM server 2104) on the host 502, an IP address, port, and/or dial-in telephone number may be used to locate the vendor 504. The host 502 may request a location update from the vendor 504 and/or the vendor 504 may send periodic location updates to the host 502. For example, the vendor 504 may send periodic location updates, inventory updates, and offered services updates to a dedicated server (e.g., vendor server 2112) on the host 502. The geographic location of a vendor 504 also may be determined by referencing an established route traveled by a vehicle of the vendor 504. For example, the host 502 may determine that a vendor vehicle is 20 minutes into a 40-minute route and then estimate the probable geographic location of the vehicle.

Next, the host 502 determines the current or anticipated proximity of the vendor 504 to the client 501 or the client's associated location (step 535). In one implementation, a dedicated server (e.g., vendor server 2112) on the host 502 determines the proximity of the vendor 504 to the client 501. Determining the proximity of the vendor 504 to the client 501 may include calculating the distance between the geographic location associated with the client 501 and the geographic location of the vendor 504. Determining the proximity of the vendor 504 to the client 501 also may include calculating the distance between the current location of the client 501 and an estimated location of a vendor 504 along an established route or current travel plan.

The host 502 then notifies the client 501 about the vendor 504 (step 540). In one implementation, the host 502 transmits a communication associated with the vendor 504 to the client 501. For example, a communications server (e.g., IM server 3104 or alert MUX 3110) on the host 502 may transmit a message to the client 501. The message may be any type of textual, graphic, audio, video, or multimedia communications, such as, for example, an instant message, an e-mail message, an advertisement, a web page, a banner ad, a "pop-up" window, a page, a telephone call, an alarm, or another communication intended to get a subscriber's attention. For example, the message may be an advertisement that includes an identification of the vendor 504, a description of the goods and/or services available from the vendor 504, a price for the available goods and/or services, the current location of the vendor 504, the distance between the vendor 504 and the client 501, and the expected travel time to the client 501. The advertisement also may include a map depicting the location of the client 501, the location of the vendor 504, and the surrounding area. The map may be dynamic representation showing updated positions of the vendor 504 in real time.

Notifying the client 501 of the vendor 504 may include determining that the proximity of the vendor 504 to the location associated with the client 501 is within a certain range (e.g., time and/or distance) before contacting the client 501. The range may vary based on the vendor 504, the available goods and/or services, the time of day, the weather, and/or subscriber preferences. Notifying the client 501 of the vendor 504 also may include accessing a database containing stored communications (e.g., advertisements) associated with various vendors and confirming with the vendor 504 that the offer conveyed by the communication can be fulfilled prior to sending the communication to the client 501.

Notifying the client 501 of the vendor 604 also may include displaying a UI to the vendor 504. The UI may include an instant messaging window identifying a list of potential customers that are online, i.e., currently accessing the host. In one implementation, a group of customers is automatically created in a user profile associated with the vendor 504. The host 502 may select members of the group that may be based on customer preferences and/or geographic location. For example, a potential customer may set preferences indicating that the potential customer would like to be notified of a mobile vendor 504. When the mobile vendor 504 enters a particular area, the host 502 creates a group of customers who are local to the area and have indicated a desire to be contacted. The vendor 504 displays a UI identifying the online members of the group. The vendor 504 is able to interact with the UI and send instant messages or alerts notifying the online group members that the vendor 504 is in the area.

The host 502 also may notify the client 501 of only the goods and/or services that are offered by the vendor and conform to the potential customer's preferences. The host 502 may select the most appropriate communication based on the preferences of the potential customer associated with the client 501. Alternatively, the host 052 may tailor the content of the communication to reflect the preferences of the potential customer associated with the client 501.

The client 501 receives the notification of the vendor 504 from the host 502 (step 545). In one implementation, the client 501 displays a UI containing the communication from the host 502. The UI may include, for example, an instant message, an e-mail message, a web page, a banner ad, a "pop-up" window, and/or a map. The UI may be interactive and may allow the potential customer to automatically communicate and/or respond to the host 502 and/or the vendor 504. The UI may include multimedia content and embedded hyperlinks, tags, and applets rendered by the client 501.

After receiving the notification from the host 502 (step 545), the client 501 responds (step 550). A potential customer viewing the notification from the host 502 has the option to ignore the notification or to respond. In one implementation, the potential customer responds by transmitting a request to the host 502. The request may be transmitted in a manner the same as or different from the manner in which the notification was received. For example, if the notification was received in an e-mail message, the potential customer may respond by transmitting an e-mail message, transmitting an instant message, or placing a telephone call.

The request from the potential customer may include, for example, a request to purchase the goods and/or services, a request for additional information, a request to be contacted at a later time, a request to purchase goods and/or services at a later time, and/or a request to purchase goods and/or services for a different prices. For example, if a particular good is advertised on behalf of a vendor 504 at a price of $10, the potential customer may request a price of $9.

The host 502 receives the potential customer's request from the client 501 (step 555) and then notifies the vendor 504 of the request (step 560). In one implementation, the host 502 receives the request at a communications server (e.g., IM server 2104) and then forwards the request to the vendor 504. In other implementations, the host 502 may combine the request with other requests to negotiate a better prices for the potential customers and/or may transmit an electronic coupon on behalf of the potential customer. The host 502 also may send driving directions to the location associated with the potential customer and/or the most efficient route for servicing several customers to the vendor 504.

The vendor 504 receives the potential customer request (step 565) and then confirms the order of the goods and/or services (step 570). In one implementation, upon receiving the potential customer request, the vendor 504 instructs the host 502 to confirm the order with the potential customer. In other implementations, the vendor 504 may receive contact information (e.g., IP address, IM screen name, e-mail address, telephone number) associated with the potential customer and confirm the order directly with the potential customer.

The vendor 504 then completes an electronic transaction with the potential customer to arrange payment for the goods and/or services (step 575). Completing the electronic transaction may include using the client 501 to display a payment form to the potential customer and requesting billing/payment information (e.g., credit card account information). Alternatively, completing the electronic transaction may include accessing a database of customer information and retrieving stored electronic payment information. The stored payment information may reside on the host 502 or at the location of a third party (e.g., bank, credit card company). In one implementation, a server (e.g., vendor server 2112) on the host 502 processes the electronic transaction. In other implementations, the vendor 504 and/or a third party processes the electronic transaction.

Finally, the vendor 504 provides the goods and/or services to the potential customer associated with the client 501 (step 580). Providing the goods and/or services may include delivering the goods and/or performing the services as soon as possible or at a time designed by the potential customer.

Figure 5:
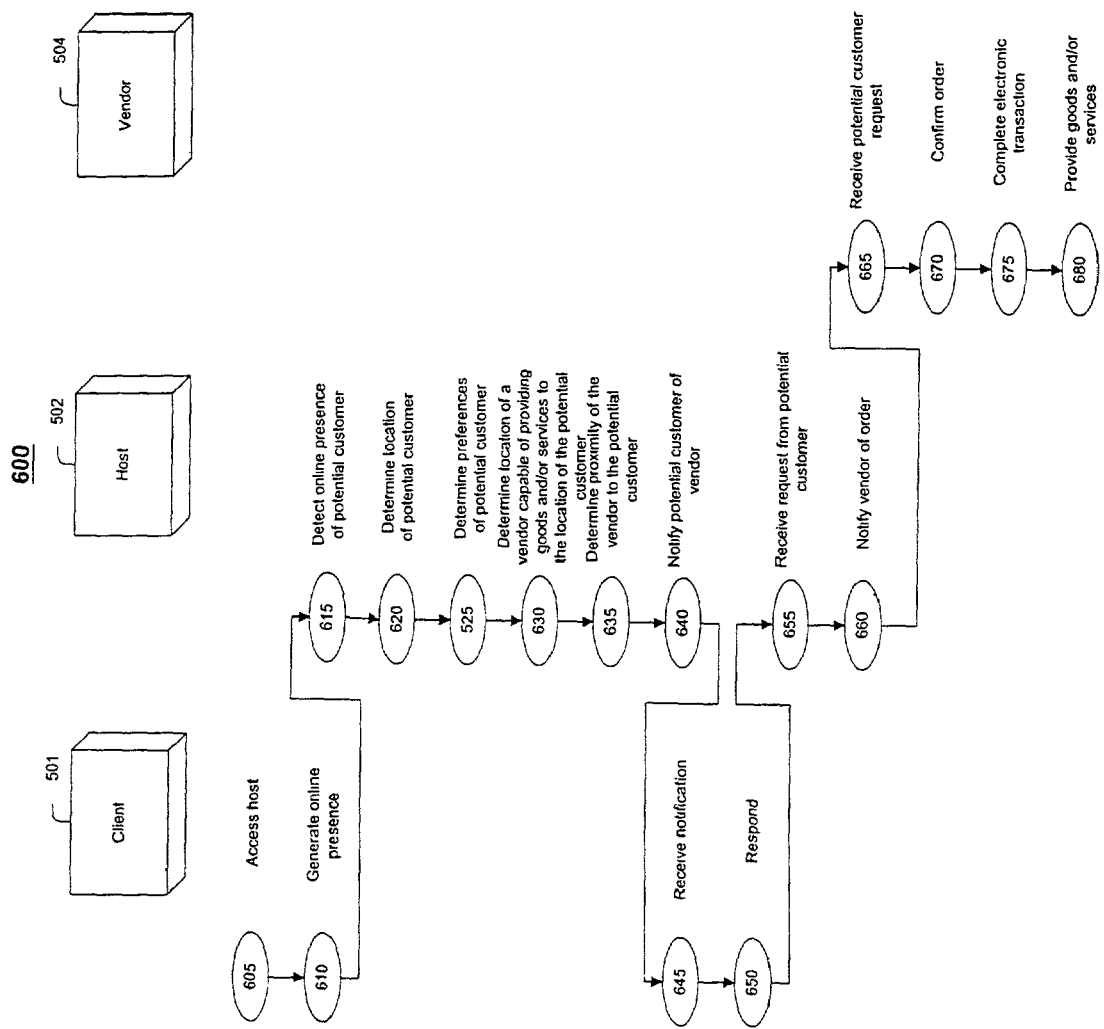

Referring to FIG. 5, the client 501, the host 502, and the vendor 504 may interact according to a procedure 600 to transfer electronic data. In general, the systems described with respect to FIG. 5 are related to the systems described with respect to FIG. 4. However, the systems are described in a context where a potential customer may be at a non-default location.

The procedure 600 of FIG. 5 generally pertains to an online shopping/buying environment in which a potential customer who is not located at a predetermined or non-default location is nevertheless notified of an opportunity to purchase an available good or service offered by the vendor 504. Situations of the potential customer being away from a predetermined location may include a potential customer using a mobile communications device as the client (e.g., a wireless phone, PDA, AOL's Mobile Communicator™). For example, the potential customer may be attending a sporting event and wish to use their mobile communications device to be notified of opportunities to interface with food vendors. In another example, during travel, a potential customer may be separated from the device or connection normally used to access online services.

Initially, the client 501 accesses a hot (step 605) and generates an online presence (step 610).

The host 502 detects the online presence of the client (step 615) and determines client location (step 610). Generally, determining the location of the client may include determining that the client is located somewhere other than their default or common location. For example, the host may recognize that an account is being accessed from a mobile device instead of from a personal computer. In another example, the host 502 may recognize that a different number or identifier was used at or supplied by the device used to originate online presence, e.g., a modem used to establish a dial-in connection. This may trigger the host 502 to determine the location of the client 501 to account for the nature of the mobile access. For example, when the host 502 recognizes that a wireless device is used as the client 501 to access the host 502, the host 502 may interface with a wireless carrier to receive the location of the wireless device. In another example, the host 502 may receive the location information from the client device itself. For example, the client 501 may send GPS information to the host 502.

The host 502 determines the preferences of the client (step 625). Determining the preferences of the client 501 may include interfacing with the client to receive more timely and/or accurate information. For example, the host 502 may use the location information determined in step 620 to determine that the client 501 is located at a sporting event. The host 502 may interface with the vendor 504 to determine the kinds of concessions available at such an event. The host 502 then may send a polling request to the client 501 with a list of the concessions available, prompting the potential customer for an order the available choices.

Determining preferences 625 also may include determining which customer associated with the client is generating the online presence. For example, a family may share a mobile device. However, the preferences of one spouse may differ significantly from the other spouse. The host 502 may determine which profile, person, or account is using the mobile device. Furthermore, when certain classes of communications (e.g., checking particular stock quotes) are conducted, the host 502 may determine that a first family member is using the device, while when other classes of communications are conducted (e.g., dialing a set of numbers), a second family member is using the device.

The host 502 determines the location of a vendor capable of providing goods and/or services to the location of the client (step 630). Typically, determining the location of the vendor includes determining that a vendor can provide the goods/services based on the non-standard location of the client 501. The host 502 determines the proximity of the vendor 504 to the client 501 (step 635).

The host 504 determines whether the vendor and potential customer are sufficiently proximate to justify notifying the potential customer of potential goods and services. For example, the host 504 may determine that, based on present traffic conditions, potential customers and vendors are proximate when the vendor can be responsive to an order within five minutes. In another example, vendor may be responsive if the vendor has a vehicle located within a predetermined geographic area (e.g., a zip code or a precinct).

When the host determines that a vendor likely fits a potential customer, the host 602 notifies client 501 of the vendor (step 640). Typically, notifying the client 501 of the vendor 504 includes notifying in a manner appropriate to the non-default location of the client. For example, when the client 501 is a wireless phone, the client 501 may send notification that compensates for the limited display capabilities on the mobile device. Accordingly, images that might appear in an advertisement sent to a personal computer might be removed or they might be replaced with a smaller or more appropriate image. Notification also may include using selection criteria to send the notification to the correct device. For example, when a mobile device and a personal computer both are using the same account to access the host 502, notifications may be sent to the mobile device, but not to the personal computer.

The client 501 receives notification (step 645). The potential customer responds to the notification (step 650). Responding to the notification may include selecting an 'accept' response indicating that the potential customer wishes to purchase the goods/services. Responding the notification may include a more detailed exchange. For example, the potential customer may specify quantities of desired goods and/or browse a catalog to see if additional goods/services are being offered.

The host 502 receives the request from the client 501 (step 655). The host 502 notifies the vendor 504 of the order (step 660). In the sporting event example, notifying the vendor 504 of the order includes letting the vendor 504 know that a potential customer generally situated in section 123 would like to order items X, Y, and Z on the menu. There may be a transaction code sent to the vendor 504 so that the vendor 504 may verify the transaction before providing goods and services. In another example, notifying the vendor 504 may include notifying the vendor 504 that the potential customer in seat 456 of section 123 has purchased items X, Y, and Z. However, there need not be a high degree of specificity in the notification. For example, notification may include a transmission that section 123 would like 30 of item X while not indicating which client 501 specifically responded to the notification. Notifying the vendor also may include transmitting a UI to the vendor, including a map depicting the location (both default and non-default locations) of the potential customer. The UI notifying the vendor also may show the updated location of the potential customer.

The vendor 504 receives the client generated request (step 665) and confirms the order (step 670). Confirming the order may include verifying that the vendor 504 is still able to provide the goods/services. For example, during the time elapsed between when the client 501 determines the location of a vendor 504 capable of providing the goods/services (step 630) and receiving the client generated request (step 655), the inventory of the vendor 504 may have been depleted and the vendor 504 may not be able to provide the selected goods/services. Confirming the order may include further determining or updating the location of the client 501. For example, when the vendor 504 receives the client generated request (step 665), the client 501 request may not include detailed location information. The vendor 504 may prompt the client 501 for precise section/seat location information, as well as to confirm price and quantities in the client request.

The vendor 504 completes the electronic transaction (step 675). Completing the electronic transaction 675 may include receiving payment information. In one example, the vendor 504 prompts the potential customer for payment. Payment information may be provided in an automated manner. For example, a potential customer using a wireless phone may be prompted to enter credit card information. In another example, a potential customer may use an electronic wallet to pay or reimburse the vendor 504. In this manner, payment information may be provided directly to a vendor 504, or it may be coordinated through a host 502. Although payment information is described as being performed at the end of procedure 500, payment information may be provided earlier. For example, the host 502 may automatically deduct payment information upon receiving the request from the client 501 (step 655). Finally, the vendor 504 provides the goods and/or services (step 680).

Figure 6:
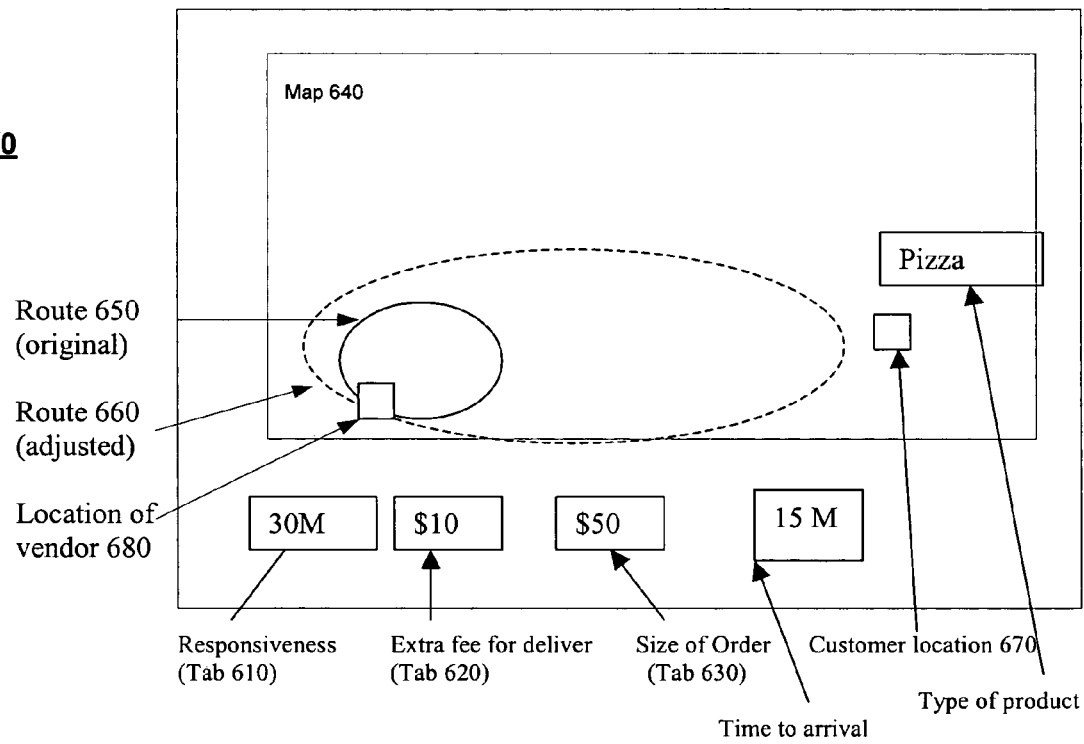
FIG. 6 shows a Graphical User Interface ("GUI") enabling a potential customer to alter their profile to increase the likelihood of a transaction.
Like elements are identified by like reference numerals.

FIG. 6 illustrates an exemplary GUI 600 showing how a potential customer may alter their profile to increase the likelihood of a transaction. For example, the default settings may classify a customer proximate to a vendor if they are located within five minutes (e.g., 3 miles) of one another. However, if a particular customer has strong interest (e.g., the customer is hungry and needs to buy dinner), then the factors that match the vendor may be tailored accordingly.

GUI 600 shows one such customer at customer location 670 in map 640. GUI 600 allows the customer to change their profile. For example, a customer may alter responsiveness tab 610 to increase a radius of proximity defining a region for which a vendor may respond. Similarly, a customer may alter extra fee tab 620 to pay extra for the extra radius and/or configure size of order tab 630 to indicate the size of the order.

In a more specific example, in GUI 600, the original route 650 may show the five-minute radius. However, when the customer changes responsiveness (tab 610), offers an extra fee for delivery (tab 620), or indicates the size of the order (tab 630), the adjusted route 660 may be changed to accommodate the inferred interest of the subscriber.

Thus, as shown in map 640, a vendor 680 dynamically changes from following route 650 to a larger route 660 to better server customer location 670.

Although GUI 600 shows a vendor altering their route, other implementations allow for additional routes to be added. Furthermore, although GUI 600 shows a display with parameters that may appear on a customer device, calculating the data and generating the display may be performed at the client, at the host, and/or at the vendor. Similarly, calculating the data and/or generating the display (e.g., GUI 600, or map 640) may be distributed across one or more systems.

Other implementations are within the scope of the following claims. In particular, the potential customer does not have to be in the same geographic proximity as the vendor. That is, a potential customer can designate a default location for delivery and receive alerts when a vendor is in proximity to the default location. In this way, a potential customer can receive an alert even if remote from the default location and/or the vendor. For example, a potential customer using a client at the potential customer's office may designate the potential customer's home as the default location so that the potential customer receives messages at the potential customer's office for use in delivering goods and/or services to the potential customer's home.

Furthermore, the notification described above and provided by or for the vendor may be provided independent of other communications, or they may be delivered or presented with other communications, for instance, within or along the borders of instant messages otherwise being received/viewed at the client.

Still further, applying the technology described above, notifications could be initiated based on both the online presence of potential customers and the movement of those customers relative to vendors, such that advertisements are presented and charged as a mobile device user navigates relative to different vendors.

In some implementations, the vendor 504 and/or the client 501 may perform one or more functions described above as being performed by the host 502. The client, host, network, and vendor also may be distributed across different entities in the communications system and may make use of one or more agents and/or proxies to perform certain functions.

What is claimed is:

1. A method of notifying a potential customer of available goods or services, the method comprising:
    establishing, at a host system configured to provide presence-based personal messaging services, personal messaging communication sessions with multiple client systems associated with multiple potential customers;
    accessing location information indicative of a first location of a mobile vendor in transit, wherein the mobile vendor has available goods or services;
    determining that the mobile vendor is in a first area based on the location information indicative of the first location of the mobile vendor;
    identifying a first group of potential customers, the first group of potential customers including the multiple potential customers that have established personal messaging communication sessions and are proximate to the first area;
    accessing location information indicative of a second location of the mobile vendor in transit;
    determining that the mobile vendor is in a second area based on the location information indicative of the second location of the mobile vendor, the second area being different than the first area;
    identifying a second group of potential customers, the second group of potential customers including the multiple potential customers that have established personal messaging communication sessions and are proximate to the second area and the second group of potential customers including at least one customer not included in the first group of potential customers;
    selecting a potential customer from among the second group of potential customers that have established personal messaging communication sessions and are proximate to the second area; and
    sending, using the host system, a personal messaging communication over an established personal messaging communication session corresponding to the selected potential customer from among the second group of potential customers that have established personal messaging communication sessions and are proximate to the second area, the personal messaging communication offering an available good or service provided by the mobile vendor to the selected potential customer.

2. The method of claim 1 wherein establishing personal messaging communication sessions with multiple client systems associated with multiple potential customers comprises establishing a connection over a network with the multiple client systems such that the potential customers are capable of receiving an instant message.

3. The method of claim 1 wherein establishing personal messaging communication sessions with multiple client systems associated with multiple potential customers comprises establishing a connection over a network between the multiple client systems and the host system configured to provide presence-based personal messing services.

4. The method of claim 1 further comprising determining a location of the multiple potential customers.

5. The method of claim 4 wherein determining the location of the multiple potential customers includes using an Internet Protocol address to determine location information.

6. The method of claim 4 wherein determining the location of the multiple potential customers includes using a telephone number to determine location information.

7. The method of claim 4 wherein determining the location of the multiple potential customers includes using a Global Positioning System to determine locating information.

8. The method of claim 1 further comprising determining preferences of the multiple potential customers, wherein selecting the potential customer from among the second group of potential customers includes selecting the potential customer from among the second group of potential customers based on the preferences.

9. The method of claim 8 wherein determining the preferences includes tracking addresses requested by the client.

10. The method of claim 8 wherein the preferences include information about contacting the one or more potential customers.

11. The method of claim 1 further comprising determining whether the mobile vendor has an available good or service to offer to multiple potential customers, wherein sending, using the host system, the personal messaging communication is conditioned on the mobile vendor having an available good or service to offer to multiple potential customers.

12. The method of claim 1 wherein determining that the mobile vendor is in the second area includes determining that the mobile vendor is in the second area by referencing the location of the mobile vendor relative to an established route.

13. The method of claim 1 wherein identifying the second group of potential customers includes calculating the distance between a current location associated with at least one of the multiple potential customers and an estimated location of the mobile vendor along an established route.

14. The method of claim 1 wherein identifying the second group of potential customers includes identifying the multiple potential customers that are proximate to the second area based on a default location of at least one of the multiple potential customers.

15. The method of claim 1 wherein establishing personal messaging communication sessions with multiple client systems associated with multiple potential customers includes determining whether a client system associated with each of the multiple potential customers is connected to the host system configured to provide presence-based personal messing services.

16. The method of claim 1 further comprising receiving a response personal messaging communication, from the selected potential customer, over the established personal messaging communication corresponding to the selected potential customer, the response personal messaging communication indicating an order by the selected potential customer of an available good or service offered by the mobile vendor.

17. The method of claim 1 further comprising determining at least one of available goods and services offered by the mobile vendor, wherein sending, using the host system, the personal messaging communication includes sending, using the host system, a personal messaging communication that includes information informing the at least one potential customer of at least one good or service offered by the mobile vendor.

18. The method of claim 1 wherein identifying the second group of potential customers that are proximate to the second area further comprises determining a distance between the mobile vendor and a location associated with at least one of the multiple potential customers.

19. The method of claim 1 further comprising transmitting a graphical user interface to a client system with the selected potential customer.

20. The method of claim 19 wherein transmitting the graphical user interface includes providing a map depicting the second location of the mobile vendor.

21. The method of claim 20 wherein the map shows updated positions of the mobile vendor.

22. The method of claim 1 further comprising notifying the mobile vendor of an order from the selected potential customer.

23. The method of claim 22 wherein notifying the mobile vendor includes providing directions to a physical location of the selected potential customer.

24. The method of claim 1 further comprising retrieving a profiles associated with potential customers included in the second group of potential customers, wherein selecting the potential customer from among the second group of potential customers includes selecting the potential customer from among the second group of potential customers based on the retrieved profiles.

25. The method of claim 24 wherein the profiles include a schedule for receiving notification, wherein selecting the potential customer from among the second group of potential customers includes selecting the potential customer from among the second group of potential customers based on the schedule for receiving notifications.

26. The method of claim 24 wherein the profiles include preferences, wherein selecting the potential customer from among the second group of potential customers includes selecting the potential customer from among the second group of potential customers based on the preferences included in the profiles.

27. The method of claim 1 further comprising notifying the at least one potential customer of different vendors.

28. The method of claim 1 wherein the mobile vendor is assigned at least one primary service and at least one secondary service.

29. The method of claim 1 further comprising determining that at least one of the multiple potential customers is at a non-default location.

30. The method of claim 29 wherein determining that the at least one potential customer is at the non-default location comprises receiving location information from a carrier providing mobile services.

31. The method of claim 29 wherein determining that the at least one potential customer is located at the non-default location includes determining that an account is being accessed from a mobile device instead of a desktop computer.

32. The method of claim 11 wherein determining whether the mobile vendor has an available good or service to offer to multiple potential customers includes determining whether the mobile vendor has the available good or service to offer to multiple potential customers based on a non-default location of at least one potential customer.

33. The method of claim 22 wherein notifying the mobile vendor comprises transmitting a graphical user interface to a computer associated with the mobile vendor.

34. The method of claim 33 wherein transmitting the graphical user interface includes providing a map depicting a location of the selected potential customer.

35. The method of claim 34 wherein the map shows updated positions of the selected potential customer.

36. A computer program for transferring electronic data from a communications system, the computer program being stored on a computer readable medium and comprising instructions for:
   establishing, at a host system configured to provide presence-based personal messaging services, personal messaging communication sessions with multiple client systems associated with multiple potential customers;
   accessing location information indicative of a first location of a mobile vendor in transit, wherein the mobile vendor has available goods or services;
   determining that the mobile vendor is in a first area based on the location information indicative of the first location of the mobile vendor;
   identifying a first group of potential customers, the first group of potential customers including the multiple potential customers that have established personal messaging communication sessions and are proximate to the first area;
   accessing location information indicative of a second location of the mobile vendor in transit;
   determining that the mobile vendor is in a second area based on the location information indicative of the second location of the mobile vendor, the second area being different than the first area;
   identifying a second group of potential customers, the second group of potential customers including the multiple potential customers that have established personal messaging communication sessions and are proximate to the second area and the second group of potential customers including at least one customer not included in the first group of potential customers;
   selecting a potential customer from among the second group of potential customers that have established personal messaging communication sessions and are proximate to the second area; and
   sending, using the host system, a personal messaging communication over an established personal messaging communication session corresponding to the selected potential customer from among the second group of potential customers that have established personal messaging communication sessions and are proximate to the second area, the personal messaging communication offering an available good or service provided by the mobile vendor to the selected potential customer.

37. The computer program of claim 36 wherein the computer readable medium comprises a disk.

38. The computer program of claim 36 wherein the computer readable medium comprises a client device.

39. The computer program of claim 36 wherein the computer readable medium comprises a host device.

40. The computer program of claim 36 wherein the computer readable medium comprises a propagated signal.

41. The computer program of claim 36 wherein the communication system comprises an online service provider.

42. The computer program of claim 36 wherein the computer program comprises a vendor computer program.

43. The computer program of claim 36 wherein identifying the second group of potential customers that are proximate to the second area includes receiving location information from a carrier providing mobile services.

44. The computer program of claim 36 further comprising instructions for determining that at least one of the multiple potential customers is at a non-default location.

45. The computer program of claim 44 wherein determining that at least one of the potential customers is located at the non-default location includes determining that an account is being accessed from a mobile device instead of a desktop computer.

46. The computer program of claim 36 further comprising instructions for determining whether the mobile vendor an available good or service to offer to multiple potential customers wherein sending, using the host system, the personal messaging communication is conditioned on the mobile vendor having an available good or service to offer to multiple potential customers.

47. The computer program of claim 46 wherein determining whether the mobile vendor has the available good or service to offer to multiple potential customers includes determining whether the mobile vendor has available good or service to offer to multiple potential customers based on a non-default location of at least one potential customer.

48. The computer program of claim 36 further comprising instructions for notifying the mobile vendor of an order from the selected potential customer.

49. The computer program of claim 48 wherein notifying the mobile vendor comprises transmitting a graphical user interface to a computer associated with the mobile vendor.

50. The computer program of claim 49 wherein providing the graphical user interface includes providing a map depicting a location of the selected potential customer.

51. The computer program of claim 50 wherein the map shows updated positions of the selected potential customer.

52. A communications apparatus for transferring electronic data from a communication system, the apparatus configured to:
   establish, at a host system configured to provide presence-based personal messaging services, personal messaging communication sessions with multiple client systems associated with multiple potential customers;
   access location information indicative of a first location of a mobile vendor in transit, wherein the mobile vendor has available goods or services;
   determine that the mobile vendor is in a first area based on the location information indicative of the first location of the mobile vendor;
   identifying a first group of potential customers, the first group of potential customers including the multiple potential customers that have established personal messaging communication sessions and are proximate to the first area;
   access location information indicative of a second location of the mobile vendor in transit;
   determining that the mobile vendor is in a second area based on the location information indicative of the second location of the mobile vendor, the second area being different than the first area;
   identify a second group of potential customers, the second group of potential customers including the multiple potential customers that have established personal messaging communication sessions and are proximate to the second area and the second group of potential customers including at least one customer not included in the first group of potential customers;

select a potential customer from among the second group of potential customers that have established personal messaging communication sessions and are proximate to the second area; and send, using the host system, a personal messaging communication over an established personal messaging communication session corresponding to the selected potential customer from among the second group of potential customers that have established personal messaging communication sessions and are proximate to the second area, the personal messaging communication offering an available good or service provided by the mobile vendor to the selected potential customer.

53. The apparatus of claim 52 wherein the communications system comprises an online service provider.

54. The apparatus of claim 52 wherein the communications system comprises a vendor system.

55. The apparatus of claim 52 wherein identifying the second group of potential customers that are proximate to the second area includes receiving location information from a carrier providing mobile services.

56. The apparatus of claim 52 further comprising determining that at least one of the multiple potential customers is at a non-default location.

57. The apparatus of claim 56 wherein determining that the at least one potential customer is located at the non-default location includes determining that an account is being accessed from a mobile device instead of a desktop computer.

58. The apparatus of claim 52 further comprising determining whether the mobile vendor an available good or service to offer to multiple potential, wherein sending, using the host system, the personal messaging communication is conditioned on the mobile vendor having an available good or service to offer to multiple potential customers.

59. The apparatus of claim 58 wherein determining whether the mobile vendor has the available good or service to offer to multiple potential customers includes determining whether the mobile vendor has available good or service to offer to multiple potential customers based on a non-default location of at least one potential customer.

60. The apparatus of claim 52 further comprising notifying the mobile vendor of an order from the selected potential customer.

61. The apparatus of claim 60 wherein notifying the mobile vendor comprises transmitting a graphical user interface to a computer associated with the mobile vendor.

62. The apparatus of claim 61 wherein providing the graphical user interface includes providing a map depicting a location of the selected potential customer.

63. The apparatus of claim 62 wherein the map shows updated positions of the selected potential customer.

64. The method of claim 1 wherein accessing location information indicative of a mobile vendor in transit includes accessing an actual location for the mobile vendor.

65. The method of claim 1 wherein accessing location information includes accessing information other than an actual location.

66. The method of claim 65 wherein accessing the information other than an actual location includes accessing a route.

67. The method of claim 65 wherein accessing the information other than an actual location includes accessing an elapsed time since the mobile vendor was at a specified location.

68. The computer program of claim 36 wherein accessing the location information indicative of a mobile vendor in transit includes accessing an actual location for the mobile vendor.

69. The computer program of claim 36 wherein accessing the location information includes accessing information other than an actual location.

70. The computer program of claim 69 wherein accessing the information other than an actual location includes accessing a route.

71. The computer program of claim 69 wherein accessing the information other than an actual location includes accessing an elapsed time since the mobile vendor was at a specified location.

72. The apparatus of claim 52 wherein accessing the location information includes accessing an actual location for the mobile vendor.

73. The apparatus of claim 52 wherein accessing the location information includes accessing information other than an actual location.

74. The apparatus of claim 73 wherein accessing the information other than an actual location includes accessing a route.

75. The apparatus of claim 73 wherein accessing the information other than an actual location includes accessing an elapsed time since the mobile vendor was at a specified location.

76. The method of claim 1 furthering comprising receiving, at the host system, an alert from the mobile vendor so that determining that the mobile vendor is in the second area, identifying the second group of potential customers, selecting the potential customer from among the second group of potential customers, and sending, using the host system, the personal messaging communication are triggered based on receipt of the alert.

77. The method of claim 76 wherein the mobile vendor sends the alert in response to updating location information for the mobile vendor.

78. The method of claim 76 wherein the mobile vendor sends the alert in response to updating inventory status for the mobile vendor.

79. The computer program of claim 36 furthering comprising instructions for receiving, at the host system, an alert from the mobile vendor so that determining that the mobile vendor is in the second area, identifying the second group of potential customers, selecting the potential customers from among the second group of potential customers, and sending, using the host system, the personal messaging communication are triggered based on receipt of the alert.

80. The computer program of claim 79 wherein the mobile vendor sends the alert in response to updating location information for the mobile vendor.

81. The computer program of claim 79 wherein the mobile vendor sends the alert in response to updating inventory status for the mobile vendor.

82. The apparatus of claim 52 wherein the apparatus is configured to receive, at the host system, an alert from the mobile vendor, the receipt of the alert triggering the apparatus to determine that the mobile vendor is in the second area, identify the second group of potential customers, select the potential customers from among the second group of potential customers, and send, using the host system, the personal messaging communication.

83. The apparatus of claim 82 wherein the mobile vendor sends the alert in response to updating location information for the mobile vendor.

84. The apparatus of claim 82 wherein the mobile vendor sends the alert in response to updating inventory status for the mobile vendor.

85. A method of notifying a potential customer of available goods or services, the method comprising:

establishing, at a host system configured to provide presence-based personal messaging services, personal messaging communication sessions with multiple client systems associated with multiple potential customers;

accessing, at the host system, location information indicative of a location of a mobile vendor in transit, wherein the mobile vendor has available goods or services to offer to the multiple potential customers;

accessing, at the host system, location information associated with the multiple potential customers that have established personal messaging communication sessions;

comparing, at the host system, the accessed location information indicative of the location of the mobile vendor in transit with the accessed location information associated with the multiple potential customers that have established personal messaging communication sessions;

based on comparison results, selecting a potential customer from among the multiple potential customers that have established personal messaging communication sessions, the selected potential customer being located proximate to the mobile vendor and having an established personal messaging communication session;

sending, using the host system, a personal messaging communication over the established personal messaging communication session corresponding to the selected potential customer located proximate to the mobile vendor, the personal messaging communication offering an available good or service provided by the mobile vendor to the selected potential customer;

receiving a response personal messaging communication, from the selected potential customer, over the established personal messaging communication session corresponding to the selected potential customer, the response personal messaging communication indicating an order by the selected potential customer of an available good or service offered by the mobile vendor; and notifying the mobile vendor of the order by the selected potential customer.

\* \* \* \* \*